(12) United States Patent
Han et al.

(10) Patent No.: US 7,433,001 B2
(45) Date of Patent: Oct. 7, 2008

(54) LIQUID CRYSTAL DISPLAY DEVICE WITH RESIN BLACK MATRIX HAVING POLARIZING FUNCTION

(75) Inventors: Sang Hun Han, Jeollabuk-do (KR); Hyun Jin Kim, Kyoungki-do (KR); Tae Kyu Park, Kyoungki-do (KR)

(73) Assignee: Boe Hydis Technology Co., Ltd. (KR)

( * ) Notice: Subject to any disclaimer, the term of this patent is extended or adjusted under 35 U.S.C. 154(b) by 411 days.

(21) Appl. No.: 11/367,728

(22) Filed: Mar. 3, 2006

(65) Prior Publication Data

US 2007/0082145 A1    Apr. 12, 2007

(30) Foreign Application Priority Data

Oct. 6, 2005    (KR) ............... 10-2005-0093742

(51) Int. Cl.
*G02F 1/1335* (2006.01)
*G02F 1/1333* (2006.01)

(52) U.S. Cl. .................. 349/96; 349/110; 349/111

(58) Field of Classification Search ............ 349/96, 349/110, 111
See application file for complete search history.

(56) References Cited

U.S. PATENT DOCUMENTS

| | | | | |
|---|---|---|---|---|
| 5,870,160 A | * | 2/1999 | Yanagawa et al. | 349/141 |
| 6,022,647 A | * | 2/2000 | Hirose et al. | 430/7 |
| 6,972,823 B2 | * | 12/2005 | Park et al. | 349/187 |

* cited by examiner

Primary Examiner—Mike Qi
(74) Attorney, Agent, or Firm—Seyfarth Shaw LLP

(57) ABSTRACT

Disclosed is a liquid crystal display (LCD) device equipped with a resin black matrix, capable of preventing the light leakage phenomenon by improving an OD (optical density) value of the resin black matrix. The LCD device includes an array substrate formed with a thin film transistor and a pixel electrode, a color filter substrate aligned opposite to the array substrate and formed with a resin black matrix and a color filter, a liquid crystal layer aligned between the array substrate and the color filter substrate, and lower and upper polarizing plates attached to outer surfaces of the array substrate and the color substrate and having transmission axes extending in the same direction. The resin black matrix has a transmission axis perpendicular to the transmission axes of the lower and upper polarizing plates so that the resin black matrix has a polarizing function.

6 Claims, 5 Drawing Sheets

LIQUID CRYSTAL DISPLAY DEVICE WITH RESIN BLACK MATRIX HAVING POLARIZING FUNCTION

BACKGROUND OF THE INVENTION

1. Field of the Invention

The present invention relates to a liquid crystal display (LCD) device. More particularly, the present invention relates to an LCD device equipped with a resin black matrix, capable of preventing the light leakage phenomenon by improving an OD (optical density) value of the resin black matrix.

2. Description of the Prior Art

As generally known in the art, an LCD device can be fabricated in a compact size with a lightweight and has low power consumption characteristics. Due to the above advantages, LCD devices have been extensively used for terminals of various information appliance or video appliances in place of cathode ray tubes (CRTs). In particular, a thin film transistor (TFT) LCD device, in which a TFT is installed for each pixel as a switching device, can provide a large-sized display screen while realizing superior image quality similar to those of the CRT, so the TFT LCD device has been spotlighted for TV markets as well as notebook PC and monitor markets.

A typical twisted nematic (TN) mode LCD mainly includes an array substrate formed with a TFT and a pixel electrode, a color filter substrate formed with a black matrix and a color filter, and a liquid crystal layer aligned between the array substrate and the color filter substrate.

Herein, the black matrix prevents light from leaking to other areas, but allows the light to be introduced into an aperture area, while preventing the color mixing between adjacent color filters having different colors.

According to the conventional method, a chrome layer is deposited on a glass substrate, and then the chrome layer (opaque metal layer) is patterned through the photo and etching processes, thereby obtaining the black matrix. Otherwise, black resin is coated on a glass substrate, and then the glass substrate coated with the black resin is subject to the exposure and development processes, thereby obtaining the black matrix.

In detail, FIGS. 1 and 2 are sectional views illustrating conventional color filter substrates, in which FIG. 1 is a sectional view illustrating a color filter substrate equipped with a chrome black matrix, and FIG. 2 is a sectional view illustrating a color filter substrate equipped with a resin black matrix.

Referring to FIGS. 1 and 2, a chrome black matrix 2a or a resin black matrix 2b is formed on a glass substrate 1 while defining a pixel area. The pixel area defined by the chrome black matrix 2a or a resin black matrix 2b is provided with a red color filter 3, a green color filter 4 and a blue color filter 5. In addition, an over-coating layer 6 is formed on the entire surface of the glass substrate 1 so as to planarize the surface of the glass substrate 1 formed with the black matrix 2a or 2b and the color filters 3, 4 and 5, thereby forming a color filter substrate 10.

Herein, in view of an OD (optical density) value, which represents the light shielding level, the chrome black matrix 2a has the OD value identical to or higher than 4, so the chrome black matrix 2a has a superior light-shielding characteristic. In addition, since the chrome black matrix 2a can be fabricated with a thin thickness of about 1500 Å, the surface of the chrome black matrix 2a can be planarized to a predetermined level, so that the process for forming the over-coating layer 6 on the glass substrate 1 can be advantageously omitted.

However, since the chrome black matrix 2a has high reflectivity, a screen of the LCD equipped with the chrome black matrix 2a may be glossy when external light radiates onto the screen. In particular, chrome is not an environment-friendly material, so the usage of chrome is restricted. Thus, as a matter of fact, it is difficult use the chrome black matrix 2a.

In contrast, the resin black matrix 2b as shown in FIG. 2 is easy to manage. In addition, since the resin black matrix 2b is not an environmental pollution material, the resin black matrix 2b is increasingly used instead of the chrome black matrix.

However, since the OD value of the resin black matrix 2b is significantly lower than that of the chrome black matrix 2a, the resin black matrix 2b must have the thickness more than 1 μm, thereby causing the problem when forming the resin black matrix 2b. In addition, even if the resin black matrix 2b has the thickness more than 1 μm, the OD value of the resin black matrix 2b is in a range of 3.0 to 3.5, so the light leakage phenomenon may occur.

Meanwhile, the OD value of the resin black matrix 2b may be improved if the thickness of the resin black matrix 2b further increases.

However, if the thickness of the resin black matrix 2b is increased, although it is possible to improve the OD value of the resin black matrix 2b, not only is the height of the resin black matrix 2b increased, but also the surface step difference may increase as shown in FIG. 3. Such an increase of the surface step difference may cause the rubbing defect in pre-determined areas of the resin black matrix 2b, which are shown in FIG. 4 as dotted lines. That is, the rubbing defect may occur in the direction opposite to the rubbing direction.

That is, as shown in FIG. 5, which is a sectional view of FIG. 4, as the thickness of the resin black matrix 2b becomes enlarged, the surface step difference of the resin black matrix 2b is also increased, so that the rubbing defect may occur in the area located just below the step difference part, that is, the rubbing defect may occur at one side of the pixel.

If the rubbing defect occurs, liquid crystal is misaligned, thereby causing the light leakage phenomenon and degrading the image quality of the LCD.

SUMMARY OF THE INVENTION

Accordingly, the present invention has been made to solve the above-mentioned problems occurring in the prior art, and an object of the present invention is to provide an LCD equipped with a resin black matrix, capable of preventing the misalignment of liquid crystal.

Another object of the present invention is to provide an LCD device equipped with a resin black matrix, capable of preventing the light leakage phenomenon by improving an OD (optical density) value of the resin black matrix.

Still another object of the present invention is to provide an LCD device equipped with a resin black matrix, capable of improving the image quality of the LCD by preventing the light leakage phenomenon.

In order to accomplish the above objects, according to the present invention, there is provided a liquid crystal display (LCD) device comprising: an array substrate formed with a thin film transistor and a pixel electrode; a color filter substrate aligned opposite to the array substrate and formed with a resin black matrix and a color filter; a liquid crystal layer aligned between the array substrate and the color filter substrate; and lower and upper polarizing plates attached to outer surfaces of the array substrate and the color substrate and having transmission axes extending in the same direction, wherein the resin black matrix has a transmission axis perpendicular to the transmission axes of the lower and upper polarizing plates so that the resin black matrix has a polarizing function.

According to the preferred embodiment of the present invention, the resin black matrix consists of an initiator, a monomer, a binder, a solvent, a carbon black, and additives.

In the resin black matrix, a dual combination structure of the monomer and the binder participating in polymerization is combined in the form of a 2+2 cycloaddition combination in response to polarized light.

Preferably, the dual combination structure of the monomer and the binder participating in the polymerization is prepared in the form of a chalcone structure.

In the resin black matrix, the monomer and the binder, which are provided through combining polarization radicals for generating the polarized light with end parts of the chalcone structure, are coated and polarized UV light is radiated onto the chalcone structure in order to activate dual combinations provided in the chalcone structure such that the polarization radicals have a predetermined directionality.

Transmission axes of the lower polarizing plate, the resin black matrix and the upper polarizing plate may cross each other.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to accompanying drawings.

An LCD according to the present invention includes an array substrate formed with a TFT and a pixel electrode, a color filter substrate aligned opposite to the array substrate and formed with a resin black matrix and a color filter, a liquid crystal layer aligned between the array substrate and the color filter substrate, and lower and upper polarizing plates attached to outer surfaces of the array substrate and the color substrate and having transmission axes extending in the same direction.

In the LCD having the above structure, the resin black matrix has a polarizing function, so that the OD value of the resin black matrix can be increased even if the thickness of the resin black matrix is not enlarged, thereby improving the image quality of the LCD.

Figure 1:
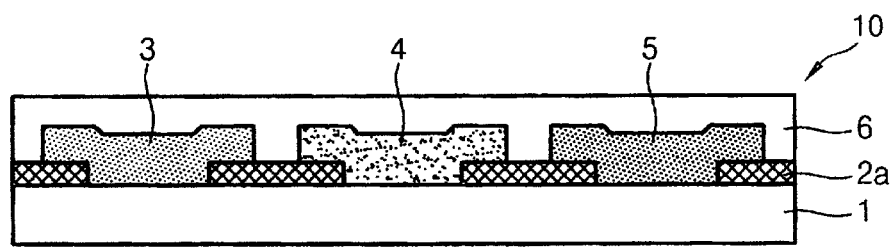
FIG. 1 is a sectional view illustrating a conventional color filter substrate equipped with a chrome black matrix.
Figure 2:
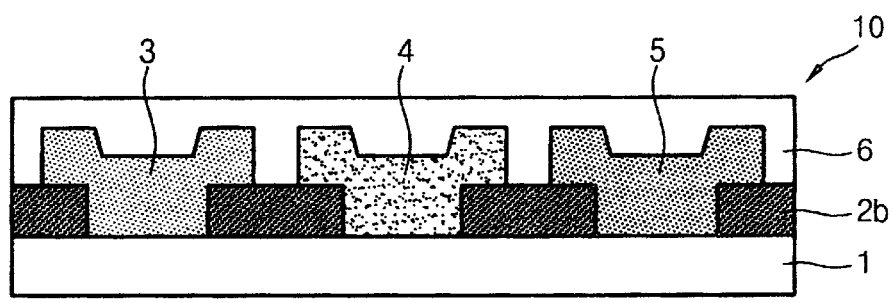
FIG. 2 is a sectional view illustrating a conventional color filter substrate equipped with a resin black matrix.
Figure 3:
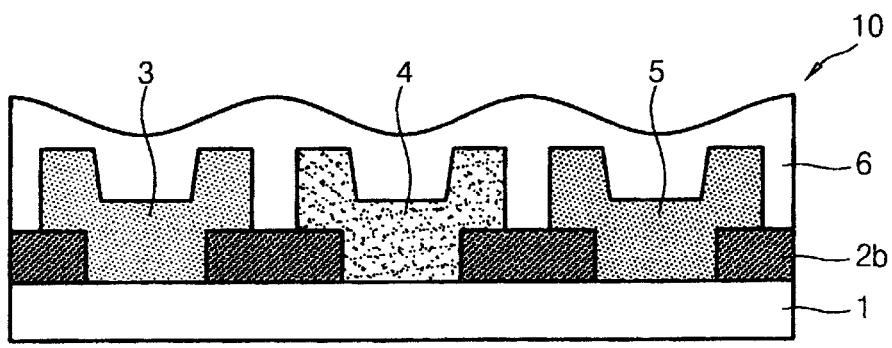
FIGS. 3 to 5 views for explaining problems of the prior art.
Figure 4:
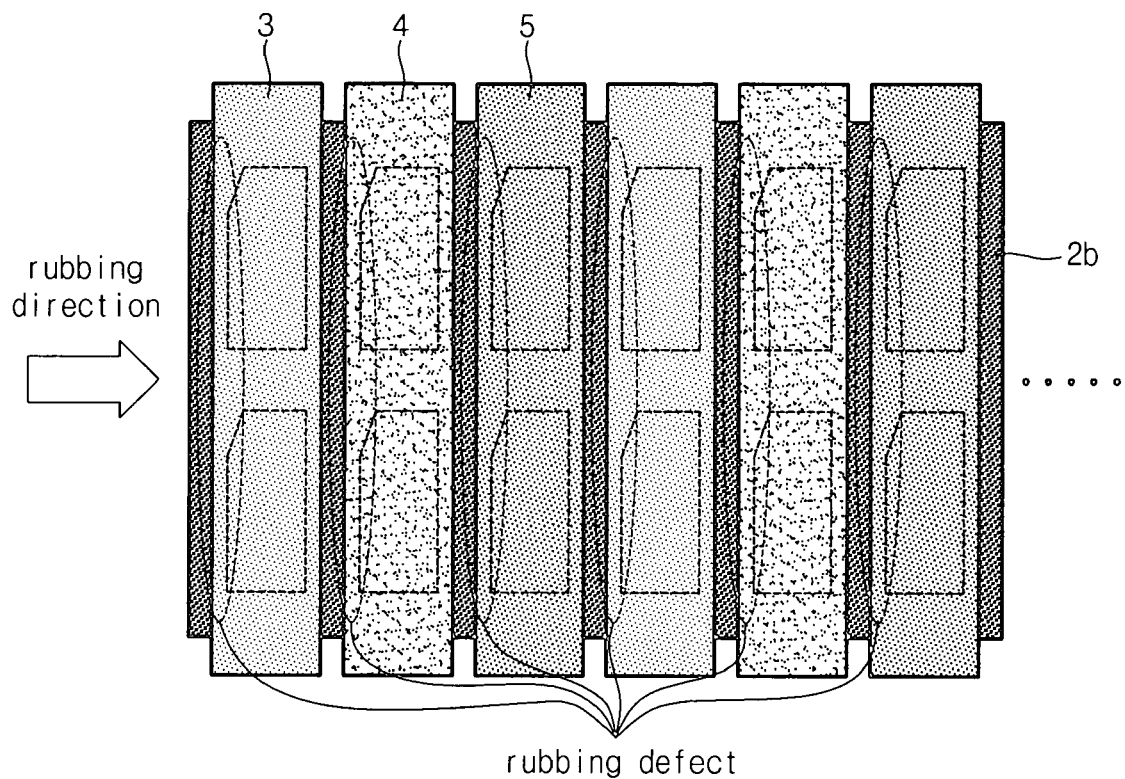
Figure 5:
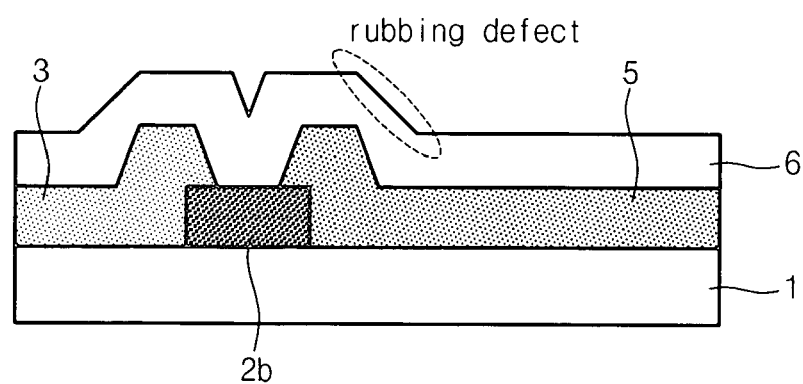
Figure 6:
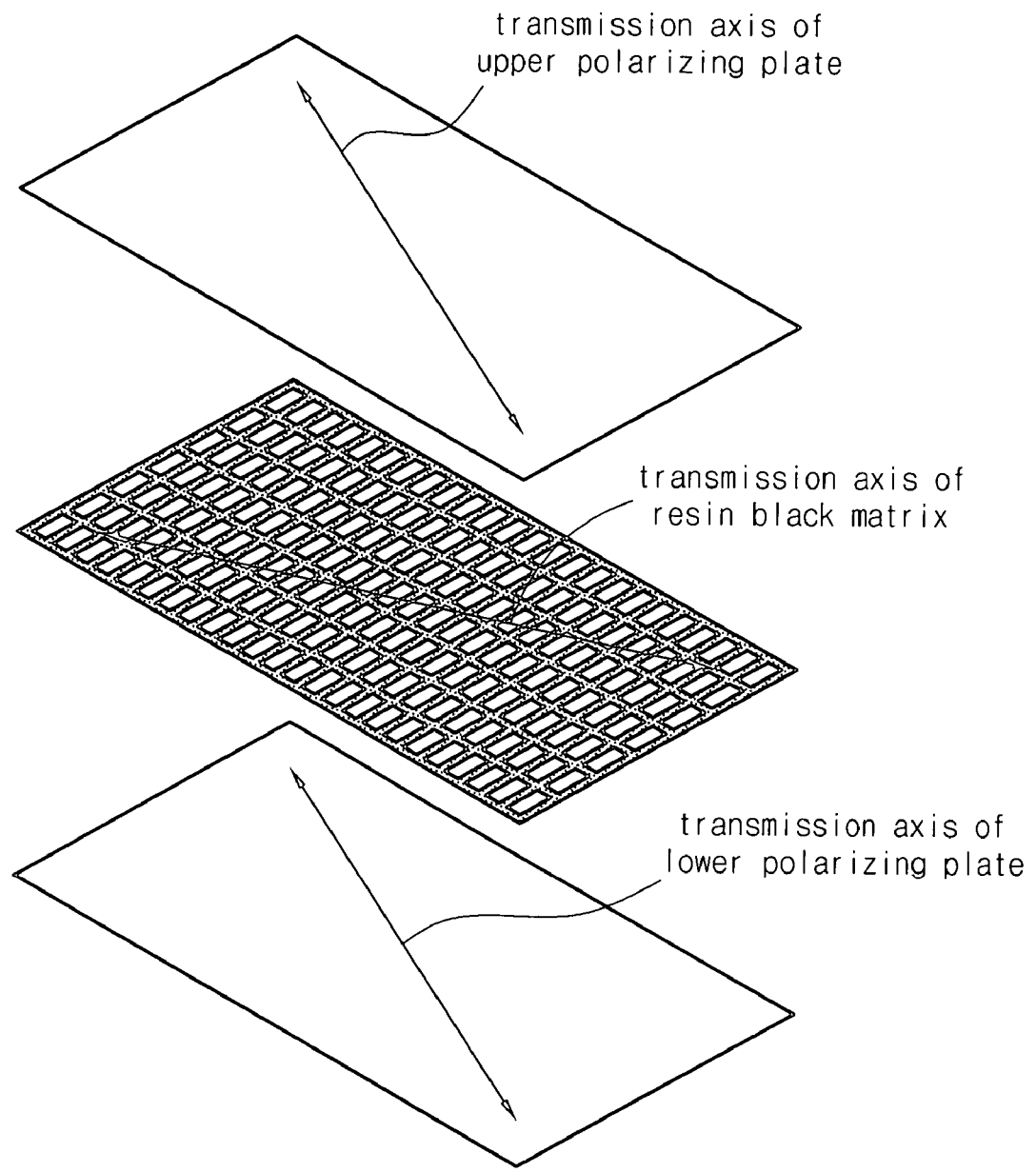
FIG. 6 is a view for explaining the direction of light in a normally black mode LCD according to one embodiment of the present invention.

FIG. 6 is a view for explaining the direction of light in a normally black mode LCD according to one embodiment of the present invention. Hereinafter, the present invention will be described in detail with reference to FIG. 6.

As shown in FIG. 6, in the normally white mode, upper and lower polarizing plates 64 and 60 have transmission axes extending in the same direction. Therefore, if the voltage is not applied, the phase of light is shifted by 90° by means of the liquid crystal layer (not shown), so that the light, which is linearly polarized by the lower polarizing plate 60, is shielded by means of the upper polarizing plate 64, and the light cannot transmit through the upper polarizing plate 64. In contrast, if the voltage is applied, the light, which is linearly polarized by the lower polarizing plate 60, is introduced into the upper polarizing plate 64 without changing the phase thereof, so that the light may transmit through the upper polarizing plate 64 without being shielded by the upper polarizing plate 64.

However, in the normally black mode, the voltage applied to liquid crystal aligned in a black matrix part, in which a gate line and a data line are arranged, is different from the voltage applied to liquid crystal aligned in a pixel part, so the light passing through the lower polarizing plate 60 has a phase difference, thereby causing the circularly polarized light or elliptically polarized light. The circularly polarized light or elliptically polarized light may partially pass through the upper polarizing plate 64 by way of the resin black matrix having a low OD value, thereby causing the light leakage phenomenon.

However, as mentioned above, if the resin black matrix 62 has the polarizing function, that is, if the resin black matrix 62 has a transmission axis perpendicular to transmission axes of the upper and lower polarizing plates 64 and 60, the circularly polarized light or elliptically polarized light passing through the resin black matrix 62 is re-polarized perpendicularly to the transmission axis of the upper polarizing plate 64, so that the circularly polarized light or elliptically polarized light may be shielded without passing through the upper polarizing plate 64.

Therefore, according to the present invention, the resin black matrix 62 is designed such that it has the transmission axis perpendicular to transmission axes of the upper and lower polarizing plates 64 and 60, thereby increasing the OD value of the resin black matrix 62. Thus, the light leakage phenomenon can be effectively prevented by means of the resin black matrix 62 having the polarizing function.

In particular, in the above-mentioned structure, three polarizing plates may have transmission axes crossing each other at the outer black matrix, in which liquid crystal may not act even if the voltage is applied, so it is possible to achieve the OD value higher than the initial OD value of the black matrix.

Table 1 shows the OD values measured by using typical polarizing plates, wherein measurement equipment is GRETAG D200-II Transmission Densitometry and arrows represent the direction of the transmission axis in each polarizing plate.

TABLE 1

| Number of polarizing plates | Transmission axis of polarizing plate | | | OD |
| --- | --- | --- | --- | --- |
| | 1 | 2 | 3 | |
| 2 | ↗ | ↘ | | 3.2 |
| 3 | ↗ | ↗ | ↘ | 3.6 |
| 3 | ↗ | ↘ | ↗ | 4.2 |

As can be understood from Table 1, if the transmission axes of adjacent polarizing plates cross each other, the OD value may increase. That is, if the resin black matrix is allowed to have the polarizing function by designing the resin black matrix to have the transmission axis perpendicular to the transmission axes of the upper and lower polarizing plate, the resin black matrix may serve as the polarizing plate, so the total OD value of the LCD may increase even if the OD value of the resin black matrix is reduced due to the limited thickness of the resin black matrix.

In addition, if the thickness of the resin black matrix becomes reduced, the surface step difference of the glass substrate may be attenuated, so the rubbing defect can be prevented.

Meanwhile, the resin black matrix having the polarizing function according to the present invention includes an initiator for initiating polymerization, a monomer for determining the hardness and property of a pattern, a binder related to development-solubility, a solvent determining the coating property, a carbon black for filtering the light, and additives related to adhesive force and other properties.

Particularly, in the resin black matrix according to the present invention, a dual combination structure of the monomer and the binder participating in the polymerization is prepared in the form of a chalcone structure in order to achieve the 2+2 cycloaddition combination in response to the polarized light.

Figure 7:
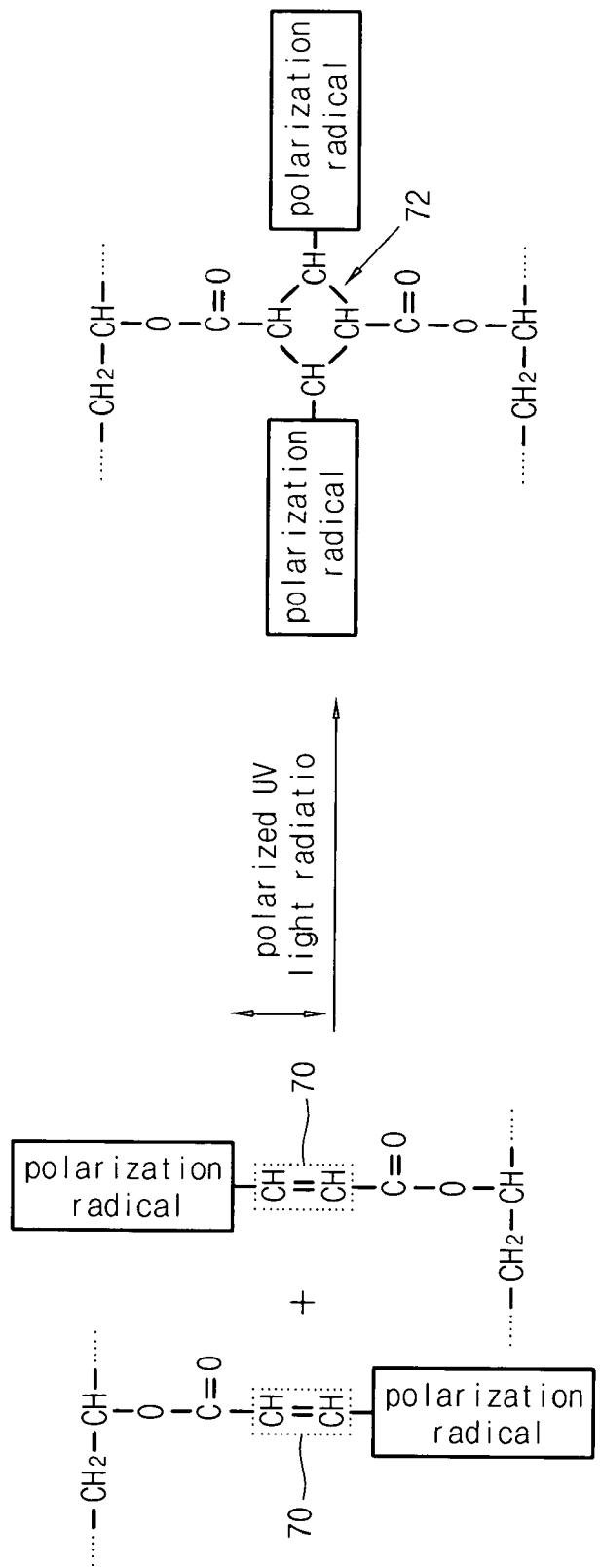
FIG. 7 is a chemical formula for explaining a polarizing function of a resin black matrix according to one embodiment of the present invention.
Figure 8:
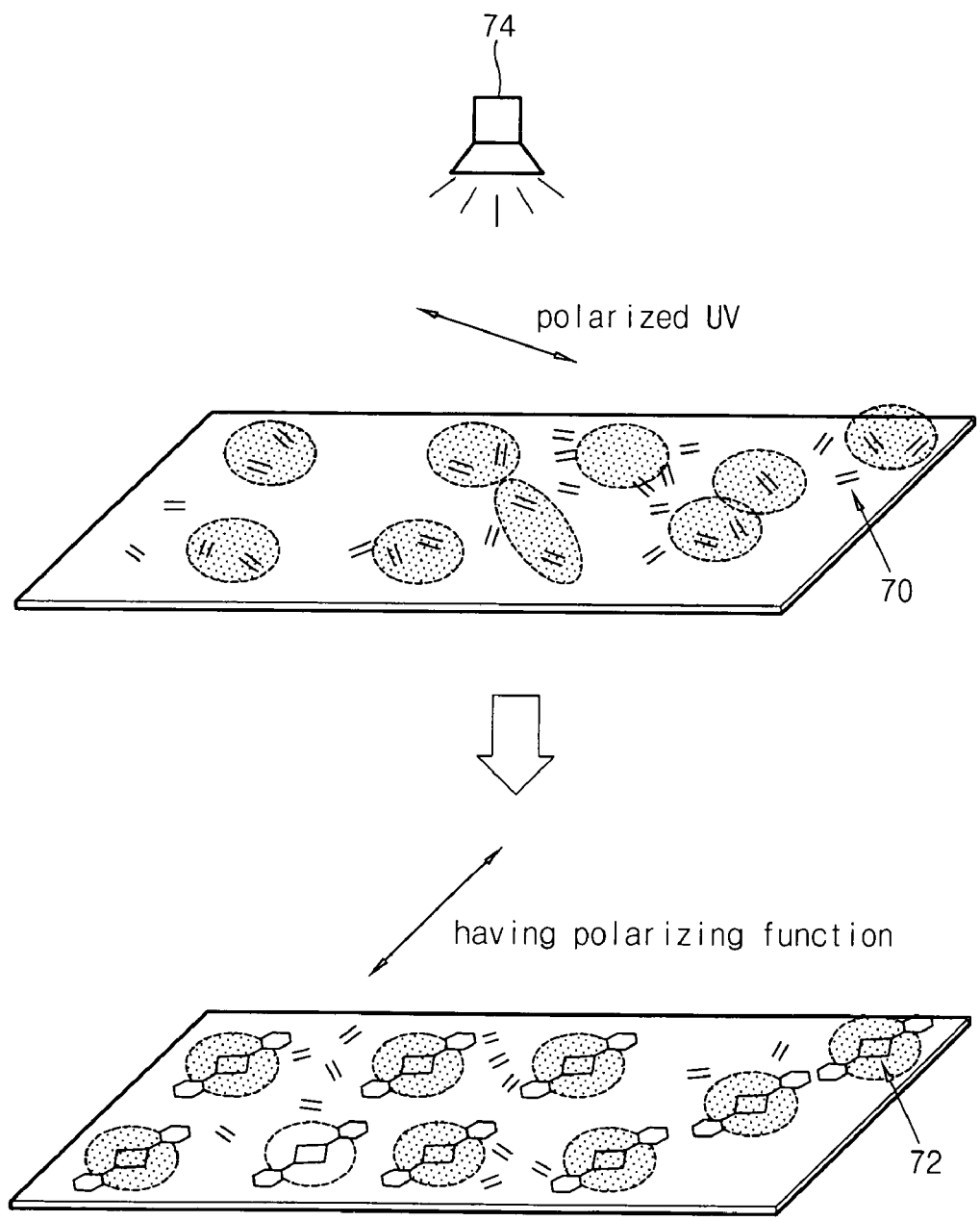
FIG. 8 is a perspective view corresponding to FIG. 7.

FIGS. 7 and 8 show a chemical formula and a structure corresponding to the chemical formula, respectively. Referring to FIGS. 7 and 8, polarization radicals for generating the polarized light are combined with end parts of the chalcone structure. Then, after coating the monomer and the binder having the above structure, polarized UV light is radiated onto the chalcone structure in order to activate dual combinations provided in the chalcone structure and aligned corresponding to the radiation direction of the polarized UV light, thereby generating radicals. Two radicals of the chalcone structure generated through the above procedure are reacted with each other, so that they are combined with each other while representing predetermined directionality.

Referring to FIG. 8, only dual combinations 70 aligned corresponding to the radiation direction of the polarized UV light generated from an exposure device 74 participate in the reaction when the polarized UV light is radiated onto the resin black matrix according to the present invention. Thus, the 2+2 cycloaddition combination 72 having the directionality corresponding to the polarized light can be obtained.

As described above, according to the present invention, the LCD is equipped with the resin black matrix having the polarizing function, so the LCD represents the higher OD value, so that the image quality of the LCD can be improved.

In addition, since the resin black matrix according to the present invention has the polarizing function, the LCD has a higher OD value even if the resin black matrix has a limited thickness.

Furthermore, according to the present invention, the resin black matrix can be fabricated with a thin thickness, so the surface step difference of the glass substrate can be reduced. Thus, it is possible to omit the process for forming an overcoating layer and to stabilize the following processes (especially, the rubbing process), thereby improving overall yield rate and productivity.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display (LCD) device comprising:
   an array substrate formed with a thin film transistor and a pixel electrode;
   a color filter substrate aligned opposite to the array substrate and formed with a resin black matrix and a color filter;
   a liquid crystal layer aligned between the array substrate and the color filter substrate; and
   lower and upper polarizing plates attached to outer surfaces of the array substrate and the color substrate and having transmission axes extending in the same direction, wherein the resin black matrix has a transmission axis perpendicular to the transmission axes of the lower and upper polarizing plates so that the resin black matrix has a polarizing function.

2. The LCD as claimed in claim 1, wherein the resin black matrix consists of an initiator, a monomer, a binder, a solvent, a carbon black, and additives.

3. The LCD as claimed in claim 2, wherein, in the resin black matrix, a dual combination structure of the monomer and the binder participating in polymerization is combined in a form of a 2+2 cycloaddition combination in response to polarized light.

4. The LCD as claimed in claim 3, wherein, in the resin black matrix, the dual combination structure of the monomer and the binder participating in the polymerization is prepared in a form of a chalcone structure.

5. The LCD as claimed in claim 4, wherein, in the resin black matrix, the monomer and the binder, which are provided through combining polarization radicals for generating the polarized light with end parts of the chalcone structure, are coated and polarized UV light is radiated onto the chalcone structure in order to activate dual combinations provided in the chalcone structure such that the polarization radicals have a predetermined directionality.

6. The LCD as claimed in claim 1, wherein transmission axes of the lower polarizing plate, the resin black matrix and the upper polarizing plate cross each other.

* * * * *